US012649700B2

(12) United States Patent　　(10) Patent No.: US 12,649,700 B2

Štyriaková　　(45) Date of Patent: Jun. 9, 2026

(54) ECOLOGICAL RELEASE OF ELEMENTS AND DEGRADATION OF ORGANICS USING HETEROTROPHIC MICROORGANISMS OUT OF MULTIPLE CARRIER MATERIALS

(71) Applicant: Darina Štyriaková, Košice (SK)

(72) Inventor: Darina Štyriaková, Košice (SK)

(*) Notice: Subject to any disclaimer, the term of this patent is extended or adjusted under 35 U.S.C. 154(b) by 608 days.

(21) Appl. No.: 18/024,377

(22) PCT Filed: Sep. 3, 2021

(86) PCT No.: PCT/EP2021/074353

§ 371 (c)(1),
(2) Date: Mar. 2, 2023

(87) PCT Pub. No.: WO2022/049239

PCT Pub. Date: Mar. 10, 2022

(65) Prior Publication Data

US 2023/0339824 A1　　Oct. 26, 2023

(30) Foreign Application Priority Data

Sep. 3, 2020　(EP) ..................................... 20194338

(51) Int. Cl.
*C05F 17/20*　　(2020.01)
*C05D 9/02*　　(2006.01)
*C22B 3/18*　　(2006.01)

(52) U.S. Cl.
CPC ................ *C05F 17/20* (2020.01); *C05D 9/02* (2013.01); *C22B 3/18* (2013.01)

(58) Field of Classification Search
CPC .............. C05F 17/20; C05D 9/02; C22B 3/18
See application file for complete search history.

(56) References Cited

U.S. PATENT DOCUMENTS

| | | |
|---|---|---|
| 4,401,638 A | 8/1983 | Caballero et al. |
| 4,405,588 A | 9/1983 | Caballero et al. |
| 5,244,493 A | 9/1993 | Brierley et al. |

| | | |
|---|---|---|
| 6,395,061 B1 | 5/2002 | Duyvesteyn et al. |
| 2016/0194734 A1 | 7/2016 | Eksteen et al. |
| 2020/0131096 A1 | 4/2020 | Kanagalingam et al. |

FOREIGN PATENT DOCUMENTS

| | | | |
|---|---|---|---|
| RU | 2603934 C1 | 12/2016 | |
| WO | 2009124355 A1 | 10/2009 | |
| WO | WO-2014198830 A1 * | 12/2014 | ............. C22B 59/00 |

OTHER PUBLICATIONS

Douglas E. Rawlings, "The microbilogy of bioming: development and optimization of mineral-oxidizing microbial consortia", Microbiology (2007), 153, 315-324.*

Espacenet Bibliographic data and Machine Translation for RU2603934C1 published Dec. 10, 2016, 12 pages.

Styriakova, et al., Dissolution of iron from quartz sands by basin bioleaching under static in-situ conditions, Hydrometallurgy, Elsevier Scientific Publishing Cy. Amsterdam, NL., vol. 104, No. 3-4 (2010) pp. 443-447.

R. Matlakowska, et al., The culturable bacteria isolated from organic-rich black shale potentially useful in biometallurgical procedures, Journal of Applied Microbiology, vol. 107, No. 3 (2009) pp. 858-866.

Lee, et al., Bio-processing of solid wastes and secondary resources for metal extraction—A review, Elsevier, vol. 32, (2012) pp. 3-18.

Sajjad, et al., Bioleaching of copper- and zinc-bearing ore using consortia of indigenous iron-oxidizing bacteria, Extremophiles, vol. 22, (2018) pp. 851-863.

* cited by examiner

*Primary Examiner* — Wayne A Langel

(74) *Attorney, Agent, or Firm* — OLIFF PLC.

(57) ABSTRACT

The present invention relates to a process of releasing metallics, metalloids and/or non-metallics and/or degradating organics by bioleaching out of a carrier material, such as minerals, rocks, wastes, soil, and sediments. Furthermore, the present invention relates to a leached formulation, obtainable form said process, and to the use of said leached formulation as a biofertilizer or biostimulant or biopestizide.

18 Claims, No Drawings

ECOLOGICAL RELEASE OF ELEMENTS AND DEGRADATION OF ORGANICS USING HETEROTROPHIC MICROORGANISMS OUT OF MULTIPLE CARRIER MATERIALS

CROSS-REFERENCE TO RELATED APPLICATIONS

This application claims priority to International Patent Application No. PCT/EP2021/074353 filed 3 Sep. 2021 which claims priority to European Patent Application EP 20194338.8 filed 3 Sep. 2020, both of which are hereby incorporated by reference in their entireties.

The present invention relates to a process of releasing metallics, metalloids and/or non-metallics and/or degradating organics out of a carrier material, such as minerals, rocks, wastes, soil, and sediments. Furthermore, the present invention relates to a leached formulation, obtainable form said process, and to the use of said leached formulation as a fertilizer.

DISCUSSION OF PRIOR ART

WO 2009/124355 A describes a process of leaching a metal value from a metal laden solid, the process including the steps of: contacting the metal laden solid with a leach solution comprising an organic bio-acid to provide a metal value containing leachate; recovering the leachate for further processing to remove the metal value; wherein at least the major proportion of the organic bio-acid in the leach solution is malic acid.

U.S. Pat. No. 6,395,061 describes a process for leaching an ore that contains nickel and magnesium comprising the steps of mixing a microorganism that is capable of producing an organic acid, a nutrient, and an ore that contains nickel and magnesium, and allowing the mixture to sit for a period of time sufficient to form an organic acid; and then contacting an ore that contains nickel and magnesium with the organic acid formed for a period of time to dissolve the nickel and form a salt solution containing a nickel salt and a magnesium salt. In this process, mainly *Aspergillus niger* is used and the main metabolite is citric acid. During the process of bioleaching, the process known form this prior art uses aeration which is disadvantageous. Moreover, the process requires a continually spraying of the heap which is once again of a disadvantage.

US 2016/0194734 A discloses a process for the recovery of metal comprising copper and/or a precious metal from a metal containing material, including the steps of leaching the metal containing material with an alkaline lixiviant and an amino acid or derivative thereof in order to produce a metal containing leachate; and extracting the metal from the leachate. Thereby, the process uses microorganisms which produce amino acids, such as glycine for leaching of Au and Cu from sulfidic raw materials and wastes. The process is combined with an additional chemical leaching by adding $H_2O_2$ in an alkaline environment.

U.S. Pat. No. 4,401,638 relates to a process of purifying silica sand. The process known from said prior art comprises the following steps of grinding sandstone to obtain sand particles; washing and desliming said particles to remove a major portion of clay-type binder contained in said sandstone; attrition-scrubbing said deslimed sand particles to release further amounts of said binder from said particles; further washing and desliming said sand thereby essentially removing said further amounts of said binder; drying and heating said sand; treating said hot sand particles with a solution of sulfuric acid to convert at least one of impurities selected from the group consisting of iron oxides, ferrosilicates and ferro-aluminous compounds into water soluble compounds; attrition-scrubbing the resulting hot suspension of said acid treated sand particles to release strongly adhering stains of said impurities from said particles; washing said suspension with cold water and desliming; conditioning said suspension with collectors and frother; floating and removing at least one of remaining ferrosilicates and iron oxides in a first flotation step conducted at a pH ranging from 1.5 to 7; and floating and removing remaining aluminosilicates in a second flotation step using a fatty amine collector in the presence of at least one activator selected from the group consisting of sulfuric acid and hydrofluoric acid. As can be derived from the afore-mentioned process description, the process is based on a difficult technology with many operation conditions and with many processes of sands purification. That said, it is a difficult chemical and physical process of sands purification without bioleaching.

U.S. Pat. No. 4,405,588 describes a process of removing iron impurities from ores comprising grinding the ore, washing and desliming the ground ore to remove the major part of the clay-type binder, attrition-scrubbing the deslimed particles to release further amounts of binder therefrom, washing and desliming to remove said binder, drying and heating the ore particles, treating the hot particles with a chemical agent suitable to convert the iron impurities into water soluble iron compounds, attrition-scrubbing the hot suspension of chemically treated particles to release the stains of iron impurities thereby forming a hot suspension of the chemically treated particles in said treating agent, and washing with cold water and desliming to recover the purified ore particles. Once again, this process involves physical and chemical processes of Fe removal and requires the use of $H_2SO_4$ and high temperatures of from 15 to 200° C.

On the website of www.energy.soton.ac.uk, a process of leaching mainly by moulds is described, wherein the main metabolite is oxalic acid. However, it is ascertained that synthetic oxalic acid better removes Fe than bioleaching. There are no active microorganisms used in this process.

RU 2 603 934 C1 describes a process of removing iron impurities from quartzite sand by bioleaching using heterotrophic microorganisms and in particular a specific association (biocomplex) of saccharomyces microorganisms (65%), bacterium (12.5%), oidium (6.5%) and other (1%). That said, the use of yeast (65%) predominates over bacteria (13%).

U.S. Pat. No. 5,244,493 relates to a process for the recovery of precious metal values, such as gold and silver, from refractory carbonaceous, or carbonaceous-sulfidic ore material. According to this process, the ore material is inoculated using a specific microbial consortium and then incubated to deactivate the carbonaceous component of the material to prevent binding of the precious metal values to the carbonaceous component. The precious metal is then recovered by conventional leaching such as cyanidation. In this process, no step of bioleaching is carried out.

The scientific article I. Styriakova et al., "Dissolution of iron from quartz sands by basin bioleaching under static in-situ conditions," HYDROMETALLURGY, ELSEVIER SCIENTIFIC PUBLISHING CY. AMSTERDAM, NL., vol. 104, no. 3-4, 1 Oct. 2010, pp. 443-447 (2010), evaluates the improvement of the quality of quartz glass using a biological basin treatment process (bioleaching) for the dissolution of iron from the quartz by using a mixture of bacteria of the same genus (*Bacillus cereus* and *Bacillus megaterium*). In this article, pure strains of *Bacillus cereus* and *Bacillus megaterium* are used.

The scientific article R. Matlakowska et al., "The culturable bacteria isolated from organic-rich black shale potentially useful in biometallurgical procedures," JOURNAL OF APPLIED MICROBIOLOGY, vol. 107, no. 3, 30 Sep. 2009, pp. 858-866 (2009) describes the metal (copper) recovery from copper hearing black shale by bioleaching and the potential use in biotechnological procedures. According to this article, the bioleaching is carried out by using single isolates (strains) of authochthonous bacteria. That said, in this study, only single isolates (strains) of autochthnonous bacteria were used for bioleaching—in detail eight bacterial strains, which were isolated from black shale ore. Phylogenetic analysis based on 16S rRNA gene homology showed that five strains belonged to the γ-Proteobacteria (*Pseudomonas, Acinetobacter*), one to the Firmicutes (*Bacillus*) and two to the Actinobacteria (*Microbacterium*).

US 2020/0131096 A1 describes a process of manufacturing a biofertilizing composition containing a microorganism consortium comprising lactic acid fermenting microbes, bacteria belonging to the Bacilli class, and yeast.

Objective Technical Problem of the Present Invention

Starting from this prior art reference, it is the objective of the present invention to provide a process for releasing metallics, metalloids and/or non-metallics and/or degradating organics out of a suitable carrier material, whereby the disadvantages of the prior art as mentioned above are abolished.

In particular, it is the objective of the present invention to provide a process of releasing metallics, metalloids and/or non-metallics and/or degradating organics out of a carrier material which avoids the need of aeration during the process.

Moreover, it is the objective of the present invention to provide a process for releasing metallics, metalloids and/or non-metallics and/or degradating organics out of a carrier material which is more efficient than processes known from the prior art.

Furthermore, it is the objective of the present invention to provide a process of releasing metallics, metalloids and/or non-metallics and/or degradating organics out of a carrier material which is less complex and complicated to carry our as compared with the known processes.

Finally, it is the objective of the present invention to provide a process of releasing metallics, metalloids and/or non-metallics and/or degradating organics out of a carrier material in which microorganisms can be used under non-sterile conditions.

Solution of the Objective Problem

These objectives are now achieved by a process of releasing metallics, metalloids and/or non-metallics and/or degradating organics out of a carrier material. The process according to the present invention is characterized by the following process steps:
   a. multiplication of natural consortia of heterotrophic bacteria;
   b. inoculating the carrier material with the consortia provided in step a; and
   c. bioleaching the metallic, metalloid, non-metallic and organic components out of the carrier material.

According to the present invention and in stark contrast to the prior art, the present invention uses a bioleaching process of a carrier material to release metallics, metalloids and/or non-metallics and/or decompose organics in which a mixture of different natural microorganisms (consortia), in particular a mixture of heterotrophic autochthonous microorganisms and heterotrophic allochthonous microorganisms, is used. Preferably, the mixture of heterotrophic autochthonous microorganisms and heterotrophic allochthonous microorganisms does not contain saccharomyces microorganisms. Moreover, it is a further requirement of the claimed process that the microorganisms result from natural spots of minerals weathering which also supports the possibility to carry out the claimed process under non-sterile conditions. These particular kinds of action allow to carry out said process also under non-sterile conditions.

Allochthonous bacteria consist of a mixture of bacteria that have been sorted and verified by laboratory experiments in bioleaching efficiency applications. Autochthonous bacteria in nonsterile conditions will always be present (in water, rock, and raw material) and are adapted to a certain physicochemical environment (pH value, temperature, $O_2$, mineral components etc.) where bioleaching takes place (deposit, heap, or rock environment). The specific medium for heterotrophic bacteria stimulates the multiplication of heterotrophic autochthonous bacteria together with the added resp. inoculated active allochthonous bacteria, thereby increasing the bioleaching effect confirmed by experiment no. 3 according to the present invention and shown below. Medium-stimulated single allochthonous bacteria are less effective than promoting them with inoculation of an active mixture of fungal-resistant autochthonous bacteria.

In the context of the present invention, bioleaching stands for an extraction of metallics, metalloids and/or non-metallics and/or degradating organics out of a carrier material from a carrier material through the use of living organisms. This is much more ecological than the traditional heap leaching using cyanide or inorganic acids, such as HF, HCl, and $H_2SO_4$.

In the context of the present invention, heterotrophic autochthonous microorganisms are a group of microorganisms, such moulds and bacteria, that are native species of that particular region, whereas heterotrophic allochthonous microorganisms refer to sediments or metallic/metalloids rich mud originating from a place other than where they are useds in this process according to the present invention. Both sorts of microorganisms use organic carbon as food (heterotrophic).

The carrier material to be treated with the process according to the present invention can be any suitable material which should be exempted from metallics, metalloids and/or non-metallics and/or in which organics should be decomposed.

In a first aspect of the present invention, the carrier material may be selected from the group consisting of minerals, rocks, wastes, soil, and sediments.

For example, the carrier material to be treated in the process according to the present invention may be an industrial mineral selected from the group consisting of silicates, oxides, hydroxides and carbonates, such as silica sand, quartz sand and gravel, quartz, quartzite, kaolin, zeolite, bentonite, smectite, montmorillonite, nontronite, sepiolite, feldspar, fluorspar, mica, limestone, dolomite, magnesite, diatomite, talc, barite, spodumene, gypsum, allanite, coltan, fluorite, borates, hormite, graphite, vermiculite, wollastonite, apatite, dunnite, sillimanite, kyanite, andalusite, phosphate minerals, potash, pumice, perlite, clays, coal, bauxite, calcium carbonate, chlorite minerals and rare earth elements; or Minerals containing critical raw materials such as beryllium, bismuth, caesium, gallium, germanium, indium, lithium, magnesium, manganese, niobium, platinum group metals, rhenium, rubidium, scandium, strontium, tantalum, tellurium, tin, titanium, tungsten, uranium, vanadium, zirconium and basic metals as nickel, zinc, copper, gold, and silver.

Furthermore, the carrier material to be treated may be a rock selected from the group consisting of granite, rhyolite, pegmatite, serpentinite, monazite, basalt, laterite, phosphorous rock and shales, gneiss, kimberlites, gold, and silver disseminated in quartz or silicate rocks and iron minerals, nepheline, and syenite.

Moreover, the carrier material may be a waste selected from the group consisting wastes from industrial mining and processing, such as iron, copper, zinc, nickel, silver, gold, lead, chromium, cadmium, arsenic, mercury, manganese, vanadium, phosphate, molybdenum, lithium, beryllium, uranium, tungsten, titanium, tin, cobalt, bismuth, platinum group, REE (rare earth elements), leukophylite tailings and waste rocks, red mud, asbestos waste, selenium waste from glass production, used industrial minerals and metallurgical waste, such as used foundry sand or metallurgical dust and sludge, water and sewage treatment sludge, fly ash, digestate, liquid manure, electronic and communal waste containing valuable or toxic elements, such as heavy metals, metalloids, or organic contaminants.

Finally, the carrier material may be a soil or sediment selected from the group consisting of soil and sediments contaminated with toxic elements, such as heavy metals, metalloids, or organic contaminants.

The present invention ca be used to release metallics, metalloids and/or non-metallics and/or decompose organics in all the aforementioned carrier materials.

As already mentioned above, the mixture to be used in the process according to the present invention is a consortium of microorganisms of heterotrophic autochthonous microorganisms and/or heterotrophic allochthonous microorganisms from natural spots of minerals weathering, whereby *saccharomyces* microorganisms are excluded.

In a further preferred embodiment of the present invention, the mixture to be used in the claimed process is a mixture (consortia) of microorganisms of heterotrophic autochthonous microorganisms and/or heterotrophic allochthonous microorganisms of different genera excluding yeast.

In a further preferred embodiment of the present invention, the mixture to be used in the claimed process is a mixture (consortia) of microorganisms of heterotrophic autochthonous microorganisms and/or heterotrophic allochthonous microorganisms of different genera. In particular, the use of a mixture of *Bacillus cereus* and *Bacillus megaterium* is excluded from the present invention.

That said, the present invention allochthonous bacteria contain only 100% bacteria and autochthonous bacteria are stimulated by the addition of media, where yeast can occur, but only in concentrations below 10%, because the addition of allochthonous bacteria suppresses the growth of autochthonous yeasts and fungi.

At least one confirmed and isolated heterotrophic microbial kind in the claimed process belong to the one of the genera *Lactobacillus, Leuconostoc, Lactococcus, Bacillus, Clostridium, Bifidobacterium, Streptococcus, Acetobacter, Pseudomonas, Enterobacter, Oenococcus, Pediococcus, Enterococcus, Citrobacter, Acinetobacter, Azotobacter* or *Arthrobacter*, whereby one genus of them predominates in an amount of at least $10^3$ CFU/g in solid sample (CFU=colony forming unit), preferably one genus of them predominates in an amount of at least $10^4$ CFU/g in solid sample (CFU=colony forming unit).

In a further preferred embodiment of the present invention, the mixture (consortia) to be used in the claimed process has to comprise at least two different genera of heterotrophic microbial kinds which have to belong to the genus *Lactobacillus, Leuconostoc, Lactococcus, Bacillus, Clostridium, Bifidobacterium, Streptococcus, Acetobacter, Pseudomonas, Enterobacter, Oenococcus, Pediococcus, Enterococcus, Citrobacter, Acinetobacter, Azotobacter* or *Arthrobacter*.

By using the aforementioned consortia of microorganisms in the bioleaching process, the efficiency of the processes known from the prior art can be improved as also shown in the examples of the present invention.

In a further preferred embodiment of the present invention, the isolated heterotrophic microbial kinds in the claimed process must belong to the genus *Lactobacillus, Bacillus, Pseudomonas*, or *Enterobacter*, whereby one genus of them predominates in an amount of at least $10^3$ CFU/g in solid sample (CFU=colony forming unit), preferably one genus of them predominates in an amount of at least $10^4$ CFU/g in solid sample (CFU=colony forming unit).

The more active microorganisms used in the present invention and in particular the mixture of heterotrophic bacteria with at least one kind belonging to the one of the genera *Lactobacillus, Leuconostoc, Lactococcus, Bacillus, Clostridium, Bifidobacterium, Streptococcus, Acetobacter, Pseudomonas, Enterobacter, Oenococcus, Pediococcus, Enterococcus, Citrobacter, Acinetobacter, Azotobacter* or *Arthrobacter* used in the bioleaching step may originate from natural places with the manifestation of weathering processes of minerals and organic source, such as grass, leaves, wood, and compost, and obtaining biogenic silicate elements.

The process according to the present invention can be carried out at any suitable temperature which can be adjusted by the person skilled in the art. However, it is in particular preferred that the bioleaching step is carried out at a temperature of at least 5° C., preferably of at least 10° C., preferably at least 12° C., more preferably at least 14° C., more preferably at least 16° C., more preferably at least 18° C., more preferably at least 20° C.

One advantage of the process according to the present invention consists in the fact that the bioleaching can be carried out under non-sterile microbiological conditions (no sterilisation processes, such as heating, disinfections etc. is necessary). This means further that the process according to the present invention can be carried out under industrial conditions, for example in unsterile basins and heaps. Under these conditions, the presence of usual environmental conditions, such as rain and dirt from the surroundings, is not excluded.

For sure, it is also possible to carry out the process under sterile laboratory conditions.

Moreover, it is possible to carry out the process ex-situ or in-situ. Ex-situ conditions represent the conditions of extracting the raw material and placing it in place of the conditions created suitable for bioleaching (e.g., heap, basin, tank). In in-situ or on-site processes, suitable conditions are created to percolate the medium and active bacteria at the site of occurrence of the raw material/waste/sample.

It is possible to carry out the process according to the present invention under weathering conditions in the open air so that it is not necessary to provide specific facilities for carrying out the step of bioleaching. For sure, it is also possible to carry out the bioleaching under non-weathering conditions, such as a closed hall.

In general, it is possible to carry out the process according to the present invention in a basin, a pool, a tank, a reactor, a pile, a heap, a washing dam, or other "in-situ" operation.

In one preferred embodiment of the process according to the present invention, the bioleaching is carried out under weathering or non-weathering conditions while organic acids-metabolites are secreted due to fermentation of an organic source. Respective organic acids-metabolites are organic acids such as acetic acid, butyric acid, pyruvic acid, lactic acid, formic acid, acetoacetic acid, succinic acid, valeric acid, fumaric acid, malic acid, glycolic acid, citric acid, oxalic acid, formic acid and/or propionic acid.

During the process of the present invention, the microorganisms are propagated and multiplicated on a sample which will be treated by bioleaching in a medium or nutrition to the required volume at a concentration of preferably at least $10^4$ CFU/g, more preferably at least $10^5$ CFU/g, more preferably at least $10^{10}$ CFU/g, for the first inoculation of a larger sample of the carrier material.

After the propagation of the microorganisms, the solid sample with solution is usually used to inoculate the carrier material or microorganisms that are released from the sample by vigorous stirring into the medium, this solution being used to inoculate the carrier material.

The volume of the inoculation solution used for bioleaching with the microorganisms is in general at least 0.01% of the volume of the carrier material.

The solution used for bioleaching has a pH value which in general does not fall below 3.5 during the whole bioleaching step and usually the pH value of the solution used for bioleaching is between 3.5 and 9.5. This pH of the solution used for the bioleaching process is a further distinguishing feature as compared with the known processes.

In case the leached material does not comprise organic components, the solution used for the bioleaching is added by such organic components.

The organic components which are either present in the leached material or added to the solution used for bioleaching are selected from the group consisting of molasses, sugar, glucose, dextrose, fucose, galactose, fructose, mannitol, maltose, glycerol. cellulose, compost, sewage sludge and digestate.

Moreover, it is in particular preferred for the solution used for bioleaching to comprise a chelate.

The chelate is preferably selected from the group consisting of ethylene diamine disuccinic acid (EDDS), trisodium salt of (S,S)-ethylene diamine disuccinic acid (Na3EDDS), ethylene diamine tetraacetic acid (EDTA), calcium disodium EDTA, diammonium EDTA ((NH4)2EDTA), dipotassium EDTA (K2-EDTA), disodium EDTA (Na2-EDTA), triethanolamine salt of EDTA (TEA-EDTA), tripotassium EDTA, trisodium EDTA, trisodium EDTA, tetrasodium EDTA, diethylene triaminepentaacetic acid (DTPA), N-(hydroxyethyl)-ethylene diamine-tetraacetic acid (HEDTA), L-glutamic acid-N,N-diacetic acid (GLDA), nitrilotriacetic acid (NTA), methyl glycinediacetic acid (MGDA), hydroxy ethyliminodiacetic acid (HEI-DA), iminodisuccinic acid (IDS), ethylenediamine-N,N'-diglutaric acid (EDDG), ethylenediamine-N,N'-dimalonic acid (EDDM), 3-hydroxy-2,2-iminodisuccinic acid, (HIDS), pyridine-2,6-dicarboxylic acid (PDA), nitrilotrimethylene-phosphonic acid (NTMP), glucoheptonate, diethylenetri-amine penta(methylene phosphonic acid) (DTPMP), hydroxyethylidenediphosphonic acid (HEDP), and nitrilot-rimethylenephosphonic acid (NTMP).

Furthermore, the solution used for bioleaching may comprise nitrogen, potassium, calcium, sulphur, magnesium, chlorine, and phosphorous as biogenic elements. In particular, the solution used for bioleaching comprise nitrogen, potassium, and phosphorous as biogenic elements.

If the solution used for bioleaching comprises nitrogen and phosphorous, these components as biogenic elements can be present in the form of fertilizers or chemical compounds.

If the solution used for bioleaching comprises nitrogen, the amount of nitrogen is preferably from 150 to 600 mg/l, more preferably from 200 to 500 mg/l, more preferably from 300 to 400 mg/I, based on the concentration of all components in the solution.

If the solution used for bioleaching comprises phosphorous, the amount of phosphorous is preferably from 10 to 50 mg/l, more preferably from 15 to 40 mg/l, more preferably from 20 to 30 mg/l, based on the concentration of all components in the solution.

If the solution used for bioleaching comprises potassium, the amount of potassium is preferably from 100 to 500 mg/l, more preferably from 150 to 350 mg/l, more preferably from 200 to 250 mg/I, based on the concentration of all components in the solution.

The solution used for bioleaching may comprise NaCl. If NaCl is used in the solution for bioleaching, the amount of NaCl is at most 0.05 g/l, preferably at most 0.5 g/l, more preferably at most 0.7 g/l.

Moreover, the present invention relates to a leached formulation, obtainable form the abovementioned process and its use as a biofertilizer, biostimulant or biopesticide.

The present invention is illustrated by the following examples:

EXAMPLE 1

300 tons of silica sand product MAP1 of Termit d.d., Drtija 51, 1251 Moravče/Slovenia was used.

The process according to the present invention was carried out in 3 basins excavated in sand, covered by clay layer and additional folia to secure impermeability. The basins have been filled with 300 tons of the silica sand product MAP1 first. 300 m³ of water from nearby creek used in sand processing was added. In parallel, a consortium of allochthonous bacteria were multiplicated up to an amount of 0.01% related to the raw material to be treated. The active mixture of isolated heterotrophic bacteria were belonging to the genus *Lactobacillus, Leuconostoc, Lactococcus, Bacillus, Clostridium, Bifidobacterium, Streptococcus, Acetobacter, Enterobacter, Oenococcus, Pediococcus, Enterococcus, Citrobacter* and *Pseudomonas*. They were identified by means of the Becton-Dickinson microbiology system (Becton Dickinson, Cockeysville, USA).

After 4 days of bioleaching, the bacteria were inoculated in the basins. As next step all nutrition components for the bacteria were added (with a total amount of 7.2 t). The nutrition components were as follows:

| element | content (mg/l) |
| --- | --- |
| N | 392.2 |
| P | 28.8 |
| K | 211 |
| Ca | 49.1 |

-continued

| element | content (mg/l) |
|---------|----------------|
| Cl | 295.8 |
| Mg | 49.3 |
| Na | 674.9 |
| S | 516.5 |
| $Na_4EDTA$ | 760 |
| Sugar | 30000 |

Outside temperature along the whole procedure was in average 17° C. (the highest 30° C., the lowest 6° C.). The pH value decreased from 7 to 4 after 10 days of bioleaching. The production of gases with bubble formation proved evidence of the fermentation of organic source and suitable bioleaching. As the water supply was available only during weekends (due to running processing in the plant), the leachate was pumped out and replaced by new water and nutrition after 14 days. The process was conducted under weathering and non-sterile conditions for 1 month. The iron concentration in the leachate after the first exchange of media was 350 mg/l and on 150 mg/l after the second removal of leachate. All iron oxides originally covering every quartz grain (responsible for the brown colour of the sand) were dissolved during the bioleaching process decreasing the $Fe_2O_3$ content from 0.13 wt % to 0.06 wt % (53.8% removal). For separating the remaining black resistant magnetic minerals, a combination with magnetic separation was used which decreased the iron content bellow 0.03% (300 ppm), fulfilling the request of the interested end-customer (a flint glass producer).

EXAMPLE 2

To compare the effectivity of the mixed bacteria consortia, a smaller test was conducted at the same conditions at Termit d.d., on 100 tons of MAP1 by only one genus—*Bacillus* spp.—obtained by heating the sample at 80° C. for 15 minutes. Under the same conditions fewer effective results in $Fe_2O_3$ removal from 0.13 wt % to 0.10 wt % (23% removal), and the brown colour was removed only partially.

Comparison of example 1 with the prior art I. Styriakova et al., "Dissolution of iron from quartz sands by basin bioleaching under static in-situ conditions", HYDROMET-ALLURGY, ELSEVIER SCIENTIFIC PUBLISHING CY. AMSTERDAM, NL., vol. 104, no. 3-4, 1 Oct. 2010, pp. 443-447 (2010):

In the process of the prior art, 49.5% of $Fe_2O_3$ was removed in the bioleaching process only with the *Bacillus* spp. In very contrast to this, example 1 shows a removal of 53% $Fe_2O_3$ with the mixture autochthonous and allochthonous heterotrophic bacteria and, thus, a superior efficiency.

EXAMPLE 3

The experiment of the effectiveness of autochthonous, allochthonous and a mixture of symbiosis of autochthonous and allochthonous bacteria was verified on three types of sand (Q1, Q2, Q3) from three localities (Šajdikové Humence, Slovakia; Moravče, Slovenia; and Petrijevči, Croatia) with iron content and the presence of autochthonous bacteria.

In the first case of testing autochthonous bacteria in parallel samples without the addition of active allochthonous bacteria and only by stimulating iron removal by adding medium during 1 month bioleaching, Fe reduction was achieved at Q1—20%, at Q2—28%, at Q3—27%.

In the second case, autochthonous bacteria was suppressed by sterilizing the sample and water to prepare the medium in parallel tests by: a) 5% $H_2O_2$ b) 3% NaClO and c) 30 minutes heating to 80° C. The 0.01% allochthonous mixture heterotrophic bacteria was inoculated in the concentration $10^8$ CFJ/ml. Fe removal increased after 1 month of bioleaching in various cases of tests a) Q1—32%, Q2—45%, Q3—42%, b) Q1—28%, Q2—39%, Q3—32%, c) Q1—36%, Q2—49%, Q3—46%.

In the third case of bioleaching without sterilization of sample and water for media preparation, the stimulating effect of using media for autochthonous and inoculated active allochthonous bacteria in parallel samples was achieved with the highest Fe removal efficiency Q1—53%, Q2—54%, Q3—52%.

Comparative Examples with Regard to the Prior Art

To compare the present invention with U.S. Pat. No. 6,395,061, a test on laterite ore with mixed autochthonous and allochthonous bacteria was carried out, wherein 45% extraction of Ni was achieved after 1 month bioleaching. In addition, we compared the bioleaching of iron oxides by *Aspergillus niger* which resulted in removal of 47.7% of the total iron in the quartz sand. The iron content decreased from 0.315% $Fe_2O_3$ to 0.164% $Fe_2O_3$ in the bioleached quartz sand by this fungi. In very contrast to this, 53% efficiency was achieved by the process according to the present invention.

In prior art reference RU 2 603 934 C1 no data on efficiency is provided. To compare the present invention with this prior art, an experiment on silica sand from Šajdikové Humence (Slovakia) with mixed culture of *Bacillus* spp. and *Saccharomyces* spp. was carried out, whereby $Fe_2O_3$ decreased by 38% (from 0,317% to 0,196%) after 1 month bioleaching (in RU 2 603 934 C1). In example 3 (third case Q1), an efficiency of 53% was achieved.

According to R. Matlakowska et al., "The culturable bacteria isolated from organic-rich black shale potentially useful in biometallurgical procedures," JOURNAL OF APPLIED MICROBIOLOGY, vol. 107, no. 3, 30 Sep. 2009, pp. 858-866 (2009), the bioleaching is carried out by using single isolates (strains) of autochthonous bacteria (LM1-LM8). The concentrations of copper and arsenic in liquid solution during 42 days of growth of bacterial isolates on mineral medium supplemented with black shale were in range 0.7 to 2 mg/l of Cu and 0.25 to 1.25 mg/l of As after 9 days and 0.75 to 2.45 mg/l of Cu and 2.5 to 4.2 mg/l of As after 42 days. In very contrast to this, experiments according to the present invention with mixture of autochthonous and allochthonous bacteria in the frame of RIS CuRE project on copper tailings from Serbia (bor mine) achieved a much higher efficiency in Cu concentration in leachate (1369 mg/l) and 1.5 mg/l of As already after 9 day of bioleaching. Moreover, high concentrations of Fe (2829 mg/I) and other elements Zn (9.6 mg/l), Sr (9.9 mg/l), Zr (5.2 mg/l), Mo (3.1 mg/l) and Hg (11.6 mg/I) were measured in the leachates after 9 days of bioleaching.

The invention claimed is:
1. A process of releasing metallics, metalloids and/or non-metallics and/or degradating organics out of a carrier material, the process comprising:
   a. providing and multiplying a solution of natural consortia of heterotrophic bacteria;

b. providing a carrier material in which at least one of metallic, metalloid, nonmetallic and organic components is found, c. inoculating the carrier material with the solution of natural consortia provided in step a; and d. bioleaching the at least one of metallic, metalloid, non-metallic and organic components out of the carrier material wherein the bioleaching is carried out under weathering or non-weathering conditions, and wherein the carrier material contains organic components, and said organic components produce by fermentation during bioleaching at least one of acetic acid, butyric acid, pyruvic acid, lactic acid, formic acid, acetoacetic acid, succinic acid, valeric acid, fumaric acid, malic acid, glycolic acid, citric acid, oxalic acid, formic acid and/or propionic acid.

2. The process of claim 1, wherein the solution used for bioleaching is a mixture of at least two of *Lactobacillus, Leuconostoc, Lactococcus, Bacillus, Clostridium, Bifidobacterium, Streptococcus, Acetobacter, Pseudomonas, Enterobacter, Oenococcus, Pediococcus, Enterococcus, Citrobacter, Acinetobacter, Azotobacter* and *Arthrobacter*, such that one genus of them predominates in an amount of at least 103 CFU/g in solid sample.

3. The process of claim 2, wherein the genus *Lactobacillus, Leuconostoc, Lactococcus, Bacillus, Clostridium, Bifidobacterium, Streptococcus, Acetobacter, Pseudomonas, Enterobacter, Oenococcus, Pediococcus, Enterococcus, Citrobacter, Acinetobacter, Azothobacter* or *Arthrobacter* used in the bioleaching step originates from natural sources from the manifestation of weathering processes of minerals and organic materials, and obtaining biogenic silicate elements.

4. The process of claim 3, wherein the organic materials are selected from the group consisting of grass, leaves, wood, and compost.

5. The process of claim 2, wherein the carrier material in which at least one of metallic, metalloid, non-metallic and organic components is found does not contain organic material, and the solution of natural consortia of heterotrophic bacteria comprises organic components selected from the group consisting of molasses, sugar, glucose, sucrose, dextrose, fucose, galactose, fructose, mannitol, maltose, glycerol, cellulose, compost, sewage sludge and digestate.

6. The process of claim 2, wherein the solution of natural consortia further comprises at least one chelate, selected from the group consisting of ethylene diamine disuccinic acid, tri-sodium salt of (S,S)-ethylene diamine disuccinic acid, ethylene diamine tetraacetic acid (EDTA), calcium disodium EDTA, diammonium EDTA, dipotassium EDTA, disodium EDTA, triethanolamine salt of EDTA, tripotassium EDTA, trisodium EDTA, trisodium EDTA, tetrasodium EDTA, diethylene triam inepentaacetic acid, N-(hydroxyethyl)-ethylene diam inetetraacetic acid, L-glutamic acid-N,N-diacetic acid, nitrilotriacetic acid, methyl glycinediacetic acid, hydroxy ethyliminodiacetic acid, iminodisuccinic acid, ethylenediamine-N,N'diglutaric acid, ethylenediamine-N,N'-dimalonic acid, 3-hydroxy-2,2-iminodisuccinic acid, pyridine-2,6-dicarboxylic acid, nitrilotrimethylenephosphonic acid, glucoheptonate, diethylenetriamine penta (methylene phosphonic acid), hydroxyethylidenediphosphonic acid, and nitrilotrimethylenephosphonic acid.

7. The process according to claim 1, wherein the carrier material is selected from the group consisting of minerals, rocks, wastes, soil, and sediments.

8. The process of claim 7, wherein the solution used for bioleaching is a mixture of at least two of *Lactobacillus, Leuconostoc, Lactococcus, Bacillus, Clostridium, Bifidobacterium, Streptococcus, Acetobacter, Pseudomonas, Enterobacter, Oenococcus, Pediococcus, Enterococcus, Citrobacter, Acinetobacter, Azotobacter* and *Arthrobacter*, such that one genus of them predominates in an amount of at least 103 CFU/g in solid sample.

9. The process of claim 7, wherein the carrier material in which at least one of metallic, metalloid, non-metallic and organic components is found does not contain organic material, and the solution of natural consortia of heterotrophic bacteria comprises organic components selected from the group consisting of molasses, sugar, glucose, sucrose, dextrose, fucose, galactose, fructose, mannitol, maltose, glycerol, cellulose, compost, sewage sludge and digestate.

10. The process of claim 1, wherein the bioleaching is carried out at a temperature of at least 5° C.

11. The process of claim 1, wherein the bioleaching is carried out in nonsterile conditions ex-situ or in-situ.

12. The process of claim 1, wherein the process is carried out under industrial conditions in unsterile basins and heaps.

13. The process of claim 1, wherein the volume of the solution of natural consortia of heterotrophic bacteria is at least 0.01% of the volume of the carrier material.

14. The process of claim 1, wherein the solution of natural consortia of heterotrophic bacteria has a pH value of between 3.5 and 9.5.

15. The process of claim 1, wherein the carrier material in which at least one of metallic, metalloid, non-metallic and organic components is found does not contain organic material, and the solution of natural consortia of heterotrophic bacteria comprises organic components selected from the group consisting of molasses, sugar, glucose, sucrose, dextrose, fucose, galactose, fructose, mannitol, maltose, glycerol, cellulose, compost, sewage sludge and digestate.

16. The process of claim 1, wherein the solution of natural consortia further comprises at least one chelate, selected from the group consisting of ethylene diamine disuccinic acid, tri-sodium salt of (S,S)-ethylene diamine disuccinic acid, ethylene diamine tetraacetic acid (EDTA), calcium disodium EDTA, diammonium EDTA, dipotassium EDTA, disodium EDTA, triethanolamine salt of EDTA, tripotassium EDTA, trisodium EDTA, trisodium EDTA, tetrasodium EDTA, diethylene triam inepentaacetic acid, N-(hydroxyethyl)-ethylene diam inetetraacetic acid, L-glutamic acid-N,N-diacetic acid, nitrilotriacetic acid, methyl glycinediacetic acid, hydroxy ethyliminodiacetic acid, iminodisuccinic acid, ethylenediamine-N,N'-diglutaric acid, ethylenediamine-N,N'-dimalonic acid, 3-hydroxy-2,2-iminodisuccinic acid, pyridine-2,6-dicarboxylic acid, nitrilotrimethylenephosphonic acid, glucoheptonate, diethylenetriamine penta (methylene phosphonic acid), hydroxyethylidenediphosphonic acid, and nitrilotrimethylenephosphonic acid.

17. A process of releasing metallics, metalloids and/or non-metallics and/or degradating organics out of a carrier material, the process comprising:

a. providing and multiplying a solution of natural consortia of heterotrophic bacteria;

b. providing a carrier material in which at least one of metallic, metalloid, nonmetallic and organic components is found, c. inoculating the carrier material with the solution of natural consortia provided in step a; and d. bioleaching the at least one of metallic, metalloid, non-metallic and organic components out of the carrier material, wherein the carrier material in which at least one of metallic, metalloid, non-metallic and organic components is found does not contain organic material, and the solution of natural consortia of heterotrophic bacteria comprises organic components selected from the group consisting of molasses, sugar, glucose, sucrose, dextrose, fucose, galactose, fructose, mannitol, maltose, glycerol, cellulose, compost, sewage sludge and digestate.

18. A process of releasing metallics, metalloids and/or non-metallics and/or degradating organics out of a carrier material, the process comprising:

a. providing and multiplying a solution of natural consortia of heterotrophic bacteria;

b. providing a carrier material in which at least one of metallic, metalloid, nonmetallic and organic components is found, c. inoculating the carrier material with the solution of natural consortia provided in step a; and d. bioleaching the at least one of metallic, metalloid, non-metallic and organic components out of the carrier material, wherein the solution of natural consortia further comprises at least one chelate, selected from the group consisting of ethylene diamine disuccinic acid, trisodium salt of (S,S)-ethylene diamine disuccinic acid, ethylene diamine tetraacetic acid (EDTA), calcium disodium EDTA, diammonium EDTA, dipotassium EDTA, disodium EDTA, triethanolamine salt of EDTA, tripotassium EDTA, trisodium EDTA, trisodium EDTA, tetrasodium EDTA, diethylene triam inepentaacetic acid, N-(hydroxyethyl)-ethylene diam inetetraacetic acid, L-glutamic acid-N,N-diacetic acid, nitrilotriacetic acid, methyl glycinediacetic acid, hydroxy ethyliminodiacetic acid, iminodisuccinic acid, ethylenediamine-N,N'-diglutaric acid, ethylenediamine-N,N'-dimalonic acid, 3-hydroxy-2,2-iminodisuccinic acid, pyridine-2,6-dicarboxylic acid, nitrilotrimethylenephosphonic acid, glucoheptonate, diethylenetriamine penta (methylene phosphonic acid), hydroxyethylidenediphosphonic acid, and nitrilotrimethylenephosphonic acid.

* * * * *